United States Patent
Qin et al.

(10) Patent No.: US 12,382,309 B2
(45) Date of Patent: Aug. 5, 2025

(54) METHOD AND APPARATUS FOR WIRELESS NETWORK CONFIGURATION, STORAGE MEDIUM AND PROCESSOR

(71) Applicants: GREE ELECTRIC APPLIANCES, INC. OF ZHUHAI, Zhuhai (CN); LEAYUN TECHNOLOGY CO., LTD. OF ZHUHAI, Zhuhai (CN)

(72) Inventors: Guangzhi Qin, Zhuhai (CN); Hongwei Xu, Zhuhai (CN); Fengmei Mao, Zhuhai (CN); Yuen Liu, Zhuhai (CN); Xilin Li, Zhuhai (CN)

(73) Assignees: GREE ELECTRIC APPLIANCES, INC. OF ZHUHAI, Zhuhai (CN); LEAYUN TECHNOLOGY CO., LTD. OF ZHUHAI, Zhuhai (CN)

( * ) Notice: Subject to any disclaimer, the term of this patent is extended or adjusted under 35 U.S.C. 154(b) by 426 days.

(21) Appl. No.: 17/693,730

(22) Filed: Mar. 14, 2022

(65) Prior Publication Data
US 2022/0201510 A1    Jun. 23, 2022

Related U.S. Application Data

(63) Continuation of application No. PCT/CN2020/112698, filed on Aug. 31, 2020.

(30) Foreign Application Priority Data

Oct. 30, 2019 (CN) .......................... 201911046698.X

(51) Int. Cl.
*H04W 24/02* (2009.01)
*H04W 48/16* (2009.01)

(52) U.S. Cl.
CPC .......... *H04W 24/02* (2013.01); *H04W 48/16* (2013.01)

(58) Field of Classification Search
CPC .............................. H04W 24/02; H04W 48/16
See application file for complete search history.

(56) References Cited

U.S. PATENT DOCUMENTS

| 8,261,256 B1 * | 9/2012 | Adler ................. G06F 3/0481 717/173 |
| 10,353,764 B1 * | 7/2019 | Cazzanti ............... H04L 41/147 |

(Continued)

FOREIGN PATENT DOCUMENTS

| CN | 103997416 A | 8/2014 |
| CN | 104506360 A | 4/2015 |

(Continued)

OTHER PUBLICATIONS

First Office Action issued in counterpart Chinese Patent Application No. 201911046698.X, dated May 29, 2020.

(Continued)

*Primary Examiner* — Michael J Moore, Jr.
(74) *Attorney, Agent, or Firm* — Westbridge IP LLC

(57) ABSTRACT

Disclosed are a method and an apparatus for wireless network configuration, a storage medium and a processor. The method includes: monitoring an execution result of a network configuration step in a wireless network configuration process; determining a corresponding failure reason when the execution result of the network configuration step is failure; and executing an operation corresponding to the failure reason. The operation comprises one of the following: outputting prompt information containing the failure reason and adjusting parameters of a network configuration device.

15 Claims, 3 Drawing Sheets

(56) References Cited

U.S. PATENT DOCUMENTS

| | | | |
|---|---|---|---|
| 10,419,908 B1* | 9/2019 | Hutz | H04W 4/50 |
| 10,593,174 B1* | 3/2020 | Yoon | H04L 12/2816 |
| 2006/0143583 A1* | 6/2006 | Diab | G06F 1/3209 |
| | | | 713/300 |
| 2006/0148486 A1* | 7/2006 | Kim | H04W 48/18 |
| | | | 455/456.1 |
| 2007/0130286 A1* | 6/2007 | Hopmann | H04L 63/06 |
| | | | 709/217 |
| 2011/0090896 A1* | 4/2011 | Bradley | H04W 24/02 |
| | | | 370/350 |
| 2014/0068719 A1* | 3/2014 | Kiukkonen | H04W 12/50 |
| | | | 726/4 |
| 2014/0075523 A1* | 3/2014 | Tuomaala | H04L 63/08 |
| | | | 726/6 |
| 2016/0103494 A1* | 4/2016 | Zehler | G06F 3/1292 |
| | | | 358/1.15 |
| 2016/0309372 A1 | 10/2016 | Su | |
| 2017/0041977 A1* | 2/2017 | Yokoyama | H04N 1/327 |
| 2017/0048728 A1* | 2/2017 | Ngo | H04W 76/15 |
| 2017/0201911 A1* | 7/2017 | Ng | H04W 36/302 |
| 2018/0302792 A1* | 10/2018 | Zhang | H04L 63/083 |
| 2018/0324899 A1* | 11/2018 | Sivavakeesar | H04W 48/16 |
| 2019/0141614 A1* | 5/2019 | Wang | H04W 8/005 |
| 2019/0373301 A1* | 12/2019 | Gunasekara | H04N 21/6405 |
| 2020/0383039 A1* | 12/2020 | Cardote | H04W 12/37 |
| 2022/0109988 A1* | 4/2022 | Kotay | H04W 76/18 |
| 2022/0182923 A1* | 6/2022 | Yao | H04W 24/10 |
| 2022/0201510 A1* | 6/2022 | Qin | H04W 24/02 |

FOREIGN PATENT DOCUMENTS

| | | | | |
|---|---|---|---|---|
| CN | 104618511 A | 5/2015 | | |
| CN | 104853406 A | 8/2015 | | |
| CN | 105338588 A | 2/2016 | | |
| CN | 105471678 A | 4/2016 | | |
| CN | 105636179 A | 6/2016 | | |
| CN | 105959968 A | 9/2016 | | |
| CN | 106993303 A | 7/2017 | | |
| CN | 107148070 A | 9/2017 | | |
| CN | 107465584 A | 12/2017 | | |
| CN | 108207022 A | 6/2018 | | |
| CN | 108366006 A | 8/2018 | | |
| CN | 108848015 A | 11/2018 | | |
| CN | 110381596 A | 10/2019 | | |
| CN | 110784906 A | 2/2020 | | |
| EP | 4138342 A1 * | 2/2023 | | H04L 12/2807 |
| JP | 2006197621 A | 7/2006 | | |
| WO | 2019042116 A1 | 3/2019 | | |

OTHER PUBLICATIONS

International Search Report issued in corresponding PCT Application No. PCT/CN2020/112698, dated Nov. 10, 2020.
Second Office Action issued in counterpart Chinese Patent Application No. 201911046698.X, dated Sep. 14, 2020.
Written Opinion issued in corresponding PCT Application No. PCT/CN2020/112698, dated Nov. 10, 2020.

* cited by examiner

METHOD AND APPARATUS FOR WIRELESS NETWORK CONFIGURATION, STORAGE MEDIUM AND PROCESSOR

CROSS-REFERENCE TO RELATED APPLICATIONS

This application is a continuation of International Application No. PCT/CN2020/112698 filed on Aug. 31, 2020, which claims priority to Chinese Patent Application No. 201911046698.X filed on Oct. 30, 2019. The disclosures of the above-mentioned applications are hereby incorporated by reference in their entireties.

TECHNICAL FIELD

This application relates to the field of smart homes, and in particular to a method, an apparatus, a storage medium and a processor for wireless network configuration.

BACKGROUND

With gradual development of smart homes, the experience of using products in smart homes has attracted more and more attention from users and research and development personnel. In smart home products, network configuration is an important part of a product having a wireless control function, and it is also a primary impression of a user when using the product. The user experience of the network configuration occupies an important position in the smart homes.

The network configuration steps for wireless products in smart homes can be summarized into seven steps. Different merchant products basically follow these seven steps except that the actual implementation methods are different. However, the experiences brought by different methods to users are much different, and the different methods also directly determine the speed and the success rate of the wireless product network configuration. In the current smart home wireless products on the market, the cause of the network configuration failure will not be displayed in the user's network configuration operation interface. For example, when the network configuration for a wireless product fails, an error message interface usually pops up and prompts the user to detect the cause.

However, this method brings a very bad experience to the user, because the user will always get the same text prompt as long as the network configuration for the wireless product fails. In fact, there are many reasons for the failure of the network configuration for the wireless product, but the user won't be able to know what actually caused the wireless network configuration failure, so it is very difficult for the user to fix it. Due to knowing nothing about the reason causing the wireless network configuration failure, the user often has to go through the network configuration process from the start, which is tedious and time-consuming.

In the related art, the network reconfiguration process after the failure of the wireless network configuration is complicated and takes a long time, but no effective solution has been proposed so far in terms of it.

SUMMARY

The embodiments of this application provide a method, an apparatus, a storage medium and a processor for wireless network configuration, so as to at least solve the technical problem that the process of re-distributing the network after the wireless network configuration fails in the related art is complicated and takes a long time.

According to an aspect of the embodiments of this application, a method for wireless network configuration is provided, which includes: monitoring an execution result of a network configuration step in a wireless network configuration process; determining a corresponding failure reason when the execution result of the network configuration step is failure; and executing an operation corresponding to the failure reason, where the operation comprises one of the following: outputting prompt information containing the failure reason and adjusting parameters of a network configuration device.

Optionally, the network configuration device comprises a mobile terminal and a wireless device, the mobile terminal is configured to send connection information of a wireless access point to the wireless device and receive a connection status returned by the wireless device, and the wireless device is configured to be connected to the wireless access point based on the connection information and be connected to a server through the wireless access point. The connection information comprises an identification of the wireless access point and a connection password.

Optionally, the executing an operation corresponding to the failure reason comprises: judging whether the failure reason lies in the network configuration device itself; outputting the prompt information if the failure reason does not lie in the network configuration device itself; and adjusting the parameters of the network configuration device if the failure reason lies in the network configuration device itself.

Optionally, the outputting the prompt information comprises: outputting prompt information indicating that the connection information is incorrect and needs to be re-entered when the failure reason lies in that the connection information is incorrect; and outputting prompt information indicating that the wireless access point cannot be connected to Internet when the failure reason lies in that the wireless access point cannot be connected to the Internet.

Optionally, adjusting the parameters of the network configuration device comprises: increasing a transmission power of the mobile terminal and extending a time length for network configuration when the failure reason lies in that the connection information is not completely transmitted within a first preset time period, or the connection status is not completely transmitted within a second preset time period; and increasing the transmission power of the wireless device when the failure reason lies in that a signal strength of the wireless device is less than a preset value.

Optionally, the network configuration step is the wireless device being connected to the server, monitoring the execution result of the network configuration step comprises: judging whether the wireless device is successfully connected to the server; determining that the execution result is success if the wireless device is successfully connected to the server; determining whether a number of times of reconnections exceeds a preset number of times if the wireless device is not successfully connected to the server; controlling the wireless device to be reconnected to the server if the number of times of reconnections does not exceed the preset number of times; and determining that the execution result is failure if the number of times of reconnections exceeds the preset number of times.

Optionally, determining a corresponding failure reason comprises: detecting whether the wireless access point can be connected to Internet; and determining that the failure reason lies in that the wireless access point cannot be connected to the Internet if the wireless access point cannot be connected to the Internet.

Optionally, detecting whether the wireless access point can be connected to Internet comprises: detecting whether a preset operation of the wireless device exists in the server, the preset operation comprising one of a login operation and an association request operation; determining that the wireless access point can be connected to the Internet if the preset operation exists in the server; and determining that the wireless access point cannot be connected to the Internet if the preset operation does not exist in the server.

Optionally, the method further comprises waiting for a third preset time before detecting whether the preset operation of the wireless device exists in the server.

Optionally, the method further comprises controlling the wireless device to be reconnected to the server if the wireless access point can be connected to the Internet.

According to another aspect of the embodiments of this application, an apparatus for wireless network configuration is also provided, which includes: a monitoring module configured to monitor an execution result of a network configuration step in a wireless network configuration process; a determining module configured to determine a corresponding failure reason when the execution result of the network configuration step is failure; and an executing module configured to execute an operation corresponding to the failure reason, wherein the operation comprises one of the following: outputting prompt information containing the failure reason and adjusting parameters of a network configuration device.

Optionally, the network configuration device comprises a mobile terminal and a wireless device, the mobile terminal is configured to send connection information of a wireless access point to the wireless device and receive a connection status returned by the wireless device, and the wireless device is configured to be connected to the wireless access point based on the connection information and be connected to a server through the wireless access point. The connection information comprises an identification of the wireless access point and a connection password.

Optionally, the executing module comprises: a judging unit configured to judge whether the failure reason lies in the network configuration device itself; an output unit configured to output the prompt information if the failure reason does not lie in the network configuration device itself; and an adjustment unit configured to adjust the parameters of the network configuration device if the failure reason lies in the network configuration device itself.

According to still another aspect of the embodiments of this application, a non-transitory storage medium is also provided. The storage medium includes a stored program, when the program is executed, any of the methods for wireless network configuration described above is implemented.

According to yet another aspect of the embodiments of this application, a processor is also provided, which is configured to run a program, any of the methods for wireless network configuration described above is executed when the program is running.

According to still yet another aspect of the embodiments of this application, a method for wireless network configuration is also provided, which includes: monitoring an execution result of a network configuration step in a wireless network configuration process; determining a corresponding failure reason when the execution result of the network configuration step is failure; judging whether the failure reason lies in a network configuration device itself; outputting prompt information if the failure reason is does not lie in the network configuration device itself; and adjusting parameters of the network configuration device if the failure reason lies in the network configuration device itself.

Through the embodiments of this application, by real-time monitoring of the execution result of each network configuration step in the wireless network configuration process, it is possible to accurately determine the failure reason when the execution result of any one of the network configuration steps is failure, and according to different failure reasons, perform operations of outputting the prompt information containing the failure reason or automatically adjust the parameters. Compared with the related art, after the network configuration fails, the user can learn the actual reason of the network configuration failure through the prompt information, and the parameters can be adjusted automatically without any need for users to reconfigure the network, so as to achieve the technical effects of reducing the complexity of the network configuration, saving the time for network configuration, improving the user experience, and then further solve the technical problems in the related art that the process of the network reconfiguration after the wireless network configuration fails is complex and time-consuming.

BRIEF DESCRIPTION OF DRAWINGS

The drawings described here are used to provide a further understanding of this application and constitute a part of this application. The exemplary embodiments and descriptions of this application are used to explain this application, and do not constitute any improper limitation of this application. In the drawings.

DETAILED DESCRIPTION OF THE EMBODIMENTS

In order to enable those skilled in the art to better understand the solutions of this application, the technical solutions in the embodiments of this application will be described clearly and completely in conjunction with the accompanying drawings in the embodiments of this application. Obviously, the described embodiments are only a part of the embodiments of this application, not all of the embodiments. Based on the embodiments in this application, all other embodiments obtained by those of ordinary skill in the art without creative work shall fall within the protection scope of this application.

It should be noted that the terms "first" and "second" in the description and claims of this application and the above-mentioned drawings are used to distinguish similar objects and are not necessarily used to describe a specific sequence or order. It should be understood that the data used in this way can be interchanged under appropriate circumstances so that the embodiments of this application described herein can be implemented in a sequence other than those illustrated or described herein. In addition, the terms "including"

and "having" and any variations of them are intended to cover non-exclusive inclusion. For example, a process, a method, a system, a product, or a device that includes a series of steps or units is not necessarily limited to those clearly listed. Those steps or units may include other steps or units that are not clearly listed or are inherent to these processes, methods, products, or device.

According to embodiments of this application, a method for wireless network configuration is provided. It should be noted that the steps shown in the flowchart of the attached drawings can be executed in a computer system such as a set of computer-executable instructions. The logical order is shown in the flowchart, but in some cases, the steps shown or described can be performed in a different order than that described here.

Figure 1:
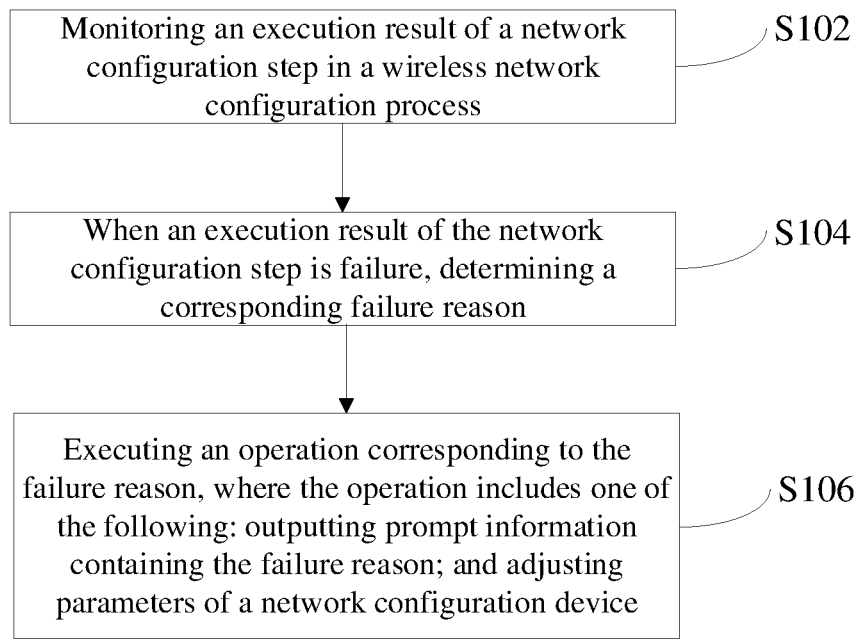
FIG. 1 is a flowchart of a method for wireless network configuration according to an embodiment of this application.

FIG. 1 is a flowchart of a method for wireless network configuration according to an embodiment of this application. As shown in FIG. 1, the method includes the following steps.

Step S102: monitoring an execution result of a network configuration step in a wireless network configuration process.

Optionally, the above-mentioned network configuration process may be a network configuration process of a smart home wireless product. The network configuration device in the network configuration process may include: a mobile terminal and a wireless device. The mobile terminal is configured to send connection information of a wireless access point to the wireless device and to receive a connection status returned by the wireless device. The wireless device is configured to be connected to the wireless access point based on the connection information and be connected to a server through the wireless access point, where the connection information includes an identification of the wireless access point and a connection password.

Specifically, the above-mentioned mobile terminal may be a terminal embedding a smart home management function, such as a smart phone, a tablet computer, an IPAD, a palmtop computer, etc., or may be a smart home management APP installed on the above-mentioned terminal. The above-mentioned wireless devices can be a smart home product such as an air conditioner, a washing machine, and an air purifier. The wireless device may be connected to the server through a built-in wireless communication module. The wireless communication module is used to implement wireless communication, and may be, but not limited to, a WiFi wireless communication module, a Bluetooth wireless communication module, etc. The above-mentioned wireless access point may be a softAP, including a WiFi router, a Bluetooth gateway, etc., but is not limited to this.

In order to enable the wireless device to be connected to the wireless access point, the user needs to send the connection information containing the identification of the wireless access point (for example, softAP ID) and the connection password to the wireless communication module of the wireless device through the mobile terminal. The wireless communication module can be connected to the specified ID through the connection password.

Figure 2:
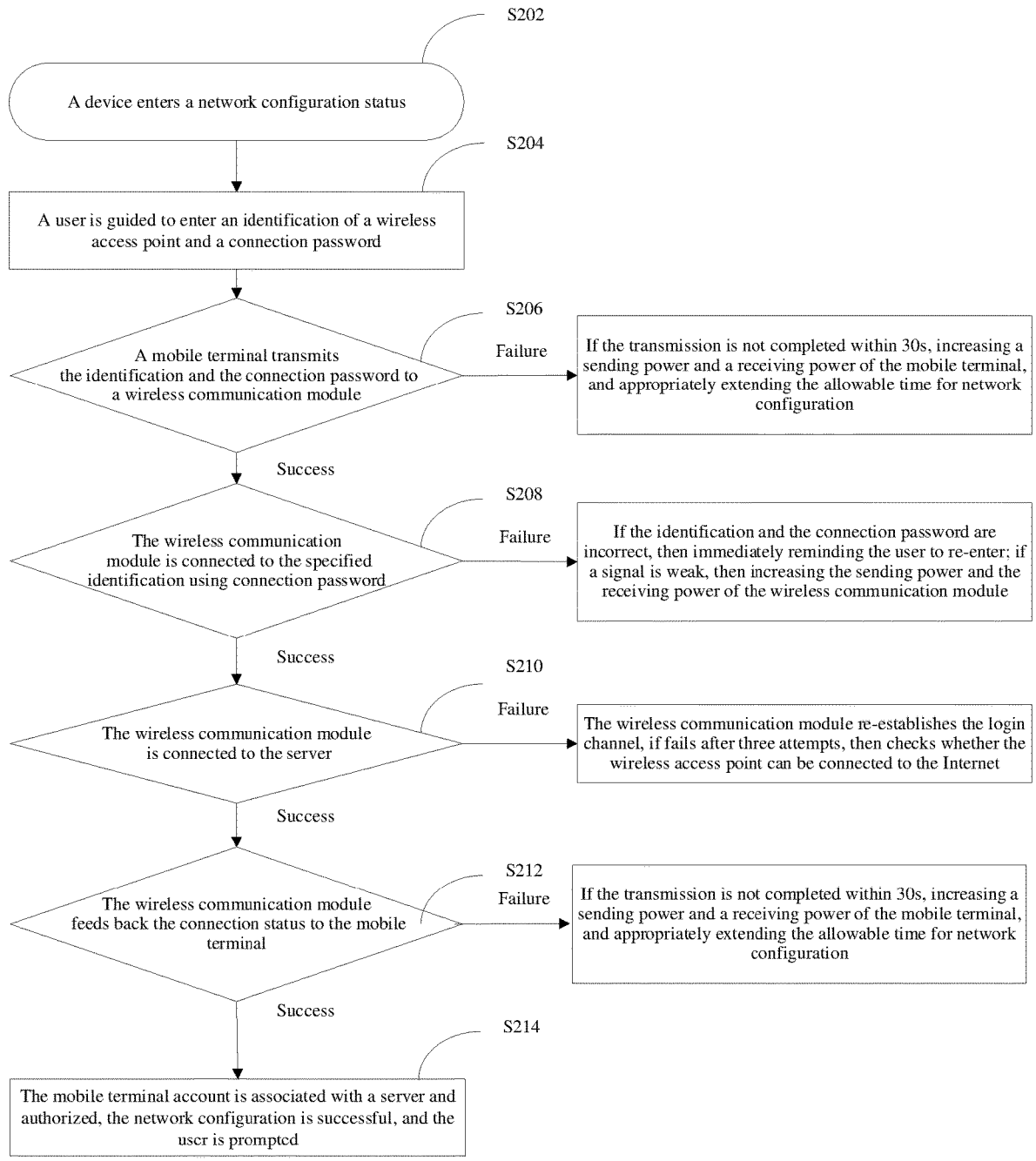
FIG. 2 is a flowchart of an optional method for wireless network configuration according to an embodiment of this application.

For example, taking the network configuration process shown in FIG. 2 as an example for detailed description, the entire network configuration process can include seven steps. At Step S202, a device enters a network configuration status. At Step S204, a user is guided to enter an identification softAP ID of a wireless access point and a connection password. At Step S206, a mobile terminal transmits the identification ID and the connection password to a wireless communication module. At Step S208, the wireless communication module is connected to the specified identification ID using the connection password. At Step S210, the wireless communication module is connected to the server. At Step S212, the wireless communication module feeds back the connection status to the mobile terminal. At Step S214, the mobile terminal account is associated with a server and authorized, the network configuration is successful, and the user is prompted.

Step S104: when an execution result of the network configuration step is failure, determining a corresponding failure reason.

Step S106: executing an operation corresponding to the failure reason, where the operation includes one of the following: outputting prompt information containing the failure reason; and adjusting parameters of a network configuration device.

In an embodiment, each network configuration step in the wireless network configuration process, such as the process shown in FIG. 2, can be monitored, and when an execution result of any of the steps is failure, a corresponding failure reason is determined and an operation corresponding to the failure reason is executed.

Specifically, the above-mentioned prompt information may include the specific reason for the network configuration failure, so that the user can learn the actual reason for the network configuration failure, avoiding repeating the entire configuration process once again.

In an alternative embodiment, in order to be able to accurately control each network configuration process, a feedback network may be used to monitor success and failure of each network configuration step in the network configuration process, and accurately determine the reasons for the failure of each network configuration step for further corresponding solutions according to different reasons for the failure. For example, prompt information containing the failure reason is directly outputted through the mobile terminal to inform the user of the specific reason for the network configuration failure; or the parameters of the network configuration device are adjusted automatically to increase the success rate of network configuration.

Through the embodiments of this application, by real-time monitoring of the execution result of each network configuration step in the wireless network configuration process, it is possible to accurately determine the failure reason when the execution result of any one of the network configuration steps is failure, and according to different failure reasons, perform operations of outputting the prompt information containing the failure reason or automatically adjust the parameters. Compared with the related art, after the network configuration fails, the user can learn the actual reason of the network configuration failure through the prompt information, and the parameters can be adjusted automatically without any need for users to reconfigure the network, so as to achieve the technical effects of reducing the complexity of the network configuration, saving the time for network configuration, improving the user experience, and then further solve the technical problems in the related art that the process of the network reconfiguration after the wireless network configuration fails is complex and time-consuming.

Optionally, in the foregoing embodiments of this application, the operations corresponding to the reason of the execution failure include: determining whether the failure reason lies in the network configuration device itself; if the failure reason does not lie in the network configuration device itself, outputting the prompt information to indicate the failure reason; instead, if the failure reason lies in the network configuration device itself, adjusting the parameters of the network configuration device.

Specifically, as shown in FIG. 2, among the seven network configuration steps, most of the steps are performed by the mobile terminal and the wireless communication module. The corresponding failure reason is usually caused by the network configuration device itself, and the problem can be solved by the network configuration device itself. However, some steps require manual operations, such as the step that the user enters the softAP ID and password. This step cannot be interfered by the mobile terminal and the wireless communication module. Whether the execution result is success depends on the user. If the softAP ID and password entered by the user are incorrect, the wireless communication module cannot be connected to the softAP, and the corresponding failure reason cannot be solved by the configuration device.

In an optional solution, after determining the reason of the network configuration failure, it can be judged whether the failure reason lies in the network configuration device itself, if not, it means that the network configuration device cannot solve the problem by itself, and the prompt information will be outputted immediately, informing the user of the reason of the problem and giving correct operation tips; instead, if it is determined that the failure reason lies in the network configuration device itself, it means that the network configuration device can solve the problem by itself, and the parameters of the network configuration device can be adjusted automatically.

Optionally, in the above-mentioned embodiments of this application, outputting the prompt information includes: in the case that the failure reason lies in the connection information error, outputting prompt information indicating that the connection information is incorrect and the connection information needs to be re-entered; if the failure reason lies in that the wireless access point cannot be connected to the Internet, outputting prompt information indicating that the wireless access point cannot be connected to the Internet.

In an optional solution, the cases that the network configuration device cannot solve the problem by itself include a cause that the user's manual operations cause the failure (for example, the softAP ID and password entered by the user are incorrect), and a case that the softAP causes the failure (for example, the softAP cannot be connected to the Internet). For the case that the user's manual operations cause the failure, the operation interface of the mobile terminal can prompt the user immediately and provide a text input box for the user to check the softAP ID and password and enter the correct softAP ID and password. For the case that the softAP causes the failure, the operation interface of the mobile terminal can immediately inform the user that the reason for the network configuration failure lies in that the softAP cannot be connected to the Internet and prompt the user to check whether the softAP at home can be connected to the Internet, so as to achieve the purpose of accurately determining the network configuration failure.

Optionally, in the foregoing embodiments of this application, adjusting the parameters of the network configuration device includes: if the failure reason lies in that the connection information is not transmitted within a first preset time period, or the connection status is not completely transmitted within a second preset time period, increasing a transmission power of the mobile terminal and a length of the network configuration; if the failure reason lies in that a signal strength of the wireless device is less than a preset value, increasing a transmission power of the wireless device.

Specifically, the above-mentioned first preset time period and second preset time period can be set according to actual network configuration needs. In the embodiments of this application, the case that the first preset time period and the second preset time period are both 30 seconds is taken as an example for detailed explanation. The above-mentioned transmission power may include a sending power and a receiving power, and a magnitude of the transmission power will affect the success rate of data transmission. The above-mentioned preset value may be a preset signal strength threshold value. The signal strength being less than the preset signal strength threshold value means the signal strength is weak, which will affect data transmission.

In an optional solution, the problems that the network configuration device can solve by itself include the problems of the mobile terminal itself and the problems of the wireless communication module itself. Since the transmission power will affect the success rate of data transmission, if the transmission of softAP ID and password is not completed within 30 seconds, or the transmission of the connection status is not completed within 30 seconds, it is determined that the failure is caused by the transmission power of the mobile terminal, which may be solved by itself through automatically increasing the sending power and the receiving power of the mobile terminal. If the signal of the wireless communication module being connected to the softAP is weak, it is determined that the failure is caused by the transmission power of the wireless communication module, and it can be solved by automatically increasing the sending power and the receiving power of the wireless communication module.

Optionally, in the above-mentioned embodiments of this application, when the network configuration step is that the wireless device is connected to the server, monitoring the execution result of the network configuration step includes: judging whether the wireless device is successfully connected to the server; if the wireless device is successfully connected to the server, confirming that the execution result is success; if the wireless device is not successfully connected to the server, determining whether the number of times of reconnections exceeds a preset number of times; if the number of times of reconnections does not exceed the preset number of times, controlling the wireless device to be reconnected to the server; if the number of times of reconnections exceeds the preset number of times, the execution result is determined to be failure.

Specifically, the above-mentioned preset number of times may be set according to actual needs. For example, in the embodiments of this application, the case that the preset number of times is three is taken as an example for detailed description.

In an optional solution, as shown in FIG. 2, for Step S210, if the wireless communication module fails to be connected to the server, the wireless communication module can re-establish the login channel, and if it still fails after three attempts, it is determined that the execution result of this step is failure, it is needed to further determine whether the softAP can be connected to the Internet.

Optionally, in the foregoing embodiments of this application, determining the corresponding failure reason includes: detecting whether the wireless access point can be connected to the Internet; if the wireless access point cannot be connected to the Internet, determining that the failure reason lies in that the wireless access point cannot be connected to the Internet.

In an optional solution, when the wireless communication module is connected to the softAP but not to the server, the wireless communication module can feed back to the mobile terminal, and the mobile terminal helps to detect whether the softAP is really unable to be connected to the Internet, if not, then immediately and accurately informs the user that the failure reason of this network configuration lies in that the softAP cannot be connected to the Internet.

Optionally, in the foregoing embodiments of this application, detecting whether the wireless access point can be connected to the Internet includes: detecting whether there is a preset operation of the wireless device in the server, where the preset operation includes one of the following: login operation and association request operation; if there is a preset operation in the server, it is determined that the wireless access point can be connected to the Internet; if there is no preset operation in the server, it is determined that the wireless access point cannot be connected to the Internet.

In an optional solution, under normal network conditions, after the wireless communication module is connected to the softAP, the server login and device associating will be completed. It can be seen that if the softAP is already connected to the Internet, the mobile terminal can go to the server to query login operation, association request operation and other operations of the wireless communication module; if the softAp cannot be connected to the Internet, the wireless communication module is successfully connected to the softAP, but login operation and association request operation of the wireless communication module cannot be queried in the server. Therefore, it can be determined whether the softAP cannot be connected to the Internet by querying login operation and association request operation of the wireless communication module in the server.

Optionally, in the foregoing embodiments of this application, after waiting for a third preset time, it is detected whether there is a preset operation in the server.

Specifically, the above-mentioned third preset time may be set according to actual network configuration requirements. For example, in the embodiments of this application, the third preset time of 30 seconds is taken as an example for detailed description.

Since 5 seconds are needed to complete the actions of server login and device association after the wireless communication module is connected to the softAP, if the query is performed immediately after the wireless communication module is successfully connected to the softAP, the actions of login and association request of the wireless communication module cannot be queried, which will lead to misjudgment as failure of the network configuration. In an optional solution, in order to avoid misjudgment and improve the success rate of network configuration, 30 seconds can be waited before querying the actions of login and association request of the wireless communication module from the server to determine whether the softAP cannot be connected to the Internet.

Optionally, in the foregoing embodiments of this application, if the wireless access point can be connected to the Internet, the wireless device is controlled to be reconnected to the server.

In an optional solution, if the mobile terminal detects that the softAP can be connected to the Internet, it can feed back to the wireless communication module, so that the wireless communication module can be reconnected to the server.

A preferred embodiment of this application will be described in detail below with reference to FIG. 2. As shown in FIG. 2, the network configuration process is as follows: a device enters a network configuration status; and a user is guided in the operation interface of the mobile terminal to enter an identification softAP ID of a wireless access point and a connection password; the execution result of transmission of the identification ID and connection password information to the wireless communication module from the mobile terminal is monitored. When the transmission failure is detected, if it is determined that the failure reason lies in that the transmission is not completed within 30 seconds, the sending power and the receiving power of the mobile terminal are increased, and the allowable time for network configuration is appropriately extended. When it is detected that the transmission is successful, proceed to the next step to monitor the execution result of connecting the specified identification ID using the connection password by the wireless communication module. When the connection failure is detected, if it is determined that the failure reason lies in that the identification ID and the connection password are incorrect, then the user is immediately reminded to re-enter; if it is determined that the failure reason lies in a weak signal, the sending power and the receiving power of the wireless communication module are increased. When connection success is detected, the next step is to monitor the execution result of the wireless communication module connecting to the server. When the connection failure is detected, the wireless communication module re-establishes the login channel. If the connection fails after three attempts, it will be checked whether the wireless access point softAP is able to be connected to the Internet, if yes, the wireless communication module will be reconnected to the server; if not, the user will be immediately and accurately informed that the reason for the network configuration failure lies in that the wireless access point softAP cannot be connected to the Internet. When connection success is detected, the next step is to monitor the execution result of the wireless communication module feeding back a connection status to the mobile terminal. When the transmission failure is detected, if it is determined that the failure is due to the failure to complete the transmission within 30 seconds, the sending power and the receiving power of the mobile terminal are increased, and the allowable time for network configuration is appropriately extended. When transmission success is detected, proceed to the next step, the server and the mobile terminal account are associated and authorized, the network configuration is successful, and the user is prompted.

Through the above solutions, this application provides a method for wireless network configuration with a feedback network and automatic adjustment. The feedback network is used to monitor the success and failure of each step in the configuration process in real time and follow up the reasons for the failure in order to solve the problem accordingly. If it is a user's manual operation error, the user can be accurately informed of the reason of the problem and given correct operation instructions immediately; if the failure is caused by the network configuration environment, the parameters of the network configuration device will be automatically adjusted to increase the success rate of the network configuration.

According to an embodiment of this application, an apparatus for wireless network configuration is provided.

Optionally, the apparatus can execute the control method of the air conditioner in the above-mentioned embodiments. The preferred implementation of the apparatus is the same as that of the control method described above and will not be repeated here.

Figure 3:
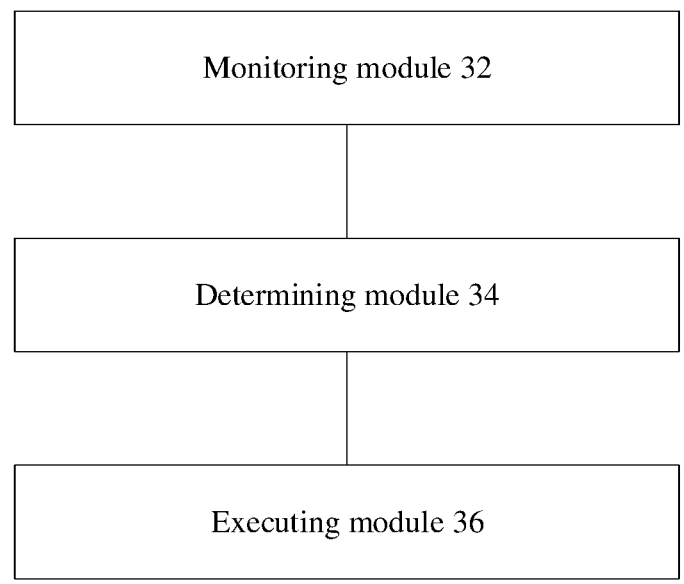
FIG. 3 is a schematic diagram of an apparatus for wireless network configuration according to an embodiment of this application.

FIG. 3 is a schematic diagram of an apparatus for wireless network configuration according to an embodiment of this application. As shown in FIG. 3, the apparatus includes:

a monitoring module 32 configured to monitor an execution result of a network configuration step in a wireless network configuration process;

a determining module 34 configured to determine a corresponding failure reason when the execution result of the network configuration step is the failure; and an executing module 36 configured to execute an operation corresponding to the failure reason, where the operation includes one of the following: outputting prompt information containing the failure reason and adjusting parameters of the network configuration device.

Through the embodiments of this application, by real-time monitoring of the execution result of each network configuration step in the wireless network configuration process, it is possible to accurately determine the failure reason when the execution result of any one of the network configuration steps is failure, and according to different failure reasons, perform operations of outputting the prompt information containing the failure reason or automatically adjust the parameters. Compared with the related art, after the network configuration fails, the user can learn the actual reason of the network configuration failure through the prompt information, and the parameters can be adjusted automatically without any need for users to reconfigure the network, so as to achieve the technical effects of reducing the complexity of the network configuration, saving the time for network configuration, improving the user experience, and then further solve the technical problems in the related art that the process of the network reconfiguration after the wireless network configuration fails is complex and time-consuming.

Optionally, in the foregoing embodiments of this application, the executing module includes: a judging unit configured to determine whether the failure reason lies in the network configuration device itself; an outputting unit configured to output the prompt information when the failure reason does not lie in the network configuration device itself; and an adjusting unit configured to adjust the parameters of the network configuration device when the failure reason lies in the network configuration device itself.

Optionally, in the foregoing embodiments of this application, the outputting unit is further configured to output the prompt information indicating that the connection information is incorrect and the connection information needs to be re-entered when the failure reason lies in the connection information error; and output a message indicating that the wireless access point cannot be connected to the Internet when the failure reason lies in that the wireless access point cannot be connected to the Internet.

Optionally, in the above-mentioned embodiments of this application, the adjusting unit is further configured to increase the transmission power of the mobile terminal and extend the length of the network configuration when the failure reason lies in that the connection information has not been transmitted within the first preset time period, or the connection status has not been transmitted within the second preset time period; and increase the transmission power of the wireless device when the failure reason lies in that the signal strength of the wireless device is less than a preset value.

Optionally, in the above-mentioned embodiments of this application, for the network configuration step of the wireless device being connected to the server, the monitoring module includes: a first judging submodule configured to judge whether the wireless device is successfully connected to the server; a first determining submodule configured to determine that the execution result is success if the wireless device is successfully connected to the server; a second judging submodule configured to determine whether the number of times of reconnections exceeds a preset number of times if the wireless device fails to be connected to the server; a controlling submodule configured to control the wireless device to be reconnected to the server if the number of times of reconnections does not exceed the preset number of times; and a second determining submodule configured to determine that the execution result is failure if the number of times of reconnections exceeds the preset number of times.

Optionally, in the above-mentioned embodiments of this application, the second determining submodule includes: a detecting unit configured to detect whether the wireless access point can be connected to the Internet; and a determining unit configured to determine that the failure reason lies in that the wireless access point cannot be connected to the Internet if the wireless access point cannot be connected to the Internet.

Optionally, in the above-mentioned embodiments of this application, the detecting unit includes: a detecting subunit configured to detect whether there is a preset operation of a wireless device in the server, where the preset operation includes one of the following: login operation and association request operation; a first determining subunit configured to determine that the wireless access point can be connected to the Internet if there is a preset operation in the server; and a second determining subunit configured to determine the wireless access point cannot be connected to the Internet if there is no preset operation in the server.

Optionally, in the foregoing embodiments of this application, the detecting subunit is further configured to wait for a third preset time before detecting whether there is a preset operation in the server.

Optionally, in the foregoing embodiments of this application, the controlling submodule is further configured to control the wireless device to be reconnected to the server if the wireless access point can be connected to the Internet.

According to an embodiment of this application, a storage medium is provided, and the storage medium includes a stored program, where the program executes any of the methods for wireless network configuration described above.

According to an embodiment of this application, a processor is provided, and the processor is configured to run a program, where any of the methods for wireless network configuration described above is executed when the program is running.

In the above-mentioned embodiments of this application, the description of each embodiment has its own focus. For parts that are not described in detail in an embodiment, reference may be made to related descriptions of other embodiments.

In the several embodiments provided in this application, it should be understood that the disclosed technical content can be implemented in other ways. Among them, the apparatus embodiments described above are merely illustrative. For example, the division of the units may be a logical function division. In actual implementation, there may be other division methods. For example, multiple units or components may be combined or may be integrate into another system, or some features can be omitted or not implemented. In addition, the displayed or discussed mutual coupling or direct coupling or communication connection may be indirect coupling or communication connection through some interfaces, units or modules, and may be in electrical or other forms.

The units described as separate components may or may not be physically separated, and the components displayed as units may or may not be physical units, that is, they may be located in one place, or they may be distributed on multiple units. Some or all of the units may be selected according to actual needs to achieve the objectives of the solutions of the embodiments.

In addition, the functional units in the various embodiments of this application may be integrated into one processing unit, or each unit may exist alone physically, or two or more units may be integrated into one unit. The above-mentioned integrated unit can be implemented in the form of hardware or software functional unit.

If the integrated unit is implemented in the form of a software functional unit and sold or used as an independent product, it can be stored in a computer readable storage medium. Based on this understanding, the technical solution of this application essentially or the part that contributes to the existing technology or all or part of the technical solution can be embodied in the form of a software product, and the computer software product is stored in a storage medium, including several instructions to make a computer device (which may be a personal computer, a server, or a network device, etc.) execute all or part of the steps of the method described in each embodiment of this application. The above-mentioned storage media includes: a U disk, a Read-Only Memory (ROM), a Random Access Memory (RAM), a mobile hard disk, a magnetic disk or an optical disk and other media that can store program codes.

The above are only the preferred embodiments of this application. It should be pointed out that for those of ordinary skill in the art, without departing from the principles of this application, several improvements and modifications can be made, and these improvements and modifications should also be regarded as the scope of protection of this application.

What is claimed is:

1. A method for wireless network configuration, comprising:
    monitoring an execution result of a network configuration step in a wireless network configuration process;
    determining a corresponding failure reason when the execution result of the network configuration step is failure; and
    executing an operation corresponding to the failure reason, wherein the operation comprises one of the following: outputting prompt information containing the failure reason and adjusting parameters of a network configuration device,
    wherein the network configuration device comprises a mobile terminal and a wireless device, the mobile terminal is configured to send connection information of a wireless access point to the wireless device, and the wireless device is configured to be connected to the wireless access point based on the connection information and then be connected to a server through the wireless access point,
    wherein executing an operation corresponding to the failure reason comprises:
    judging whether the failure reason lies in the network configuration device itself;
    outputting the prompt information if the failure reason does not lie in the network configuration device itself; and
    adjusting the parameters of the network configuration device if the failure reason lies in the network configuration device itself.

2. The method according to claim 1, wherein the mobile terminal is further configured to receive a connection status returned by the wireless device.

3. The method according to claim 2, wherein the connection information comprises an identification of the wireless access point and a connection password.

4. The method according to claim 1, wherein outputting the prompt information comprises:
    outputting prompt information indicating that the connection information is incorrect and needs to be re-entered when the failure reason lies in that the connection information is incorrect; and
    outputting prompt information indicating that the wireless access point cannot be connected to Internet when the failure reason lies in that the wireless access point cannot be connected to the Internet.

5. The method according to claim 1, wherein adjusting the parameters of the network configuration device comprises:
    increasing a transmission power of the mobile terminal and extending a time length for network configuration when the failure reason lies in that the connection information is not completely transmitted within a first preset time period, or the connection status is not completely transmitted within a second preset time period; and
    increasing the transmission power of the wireless device when the failure reason lies in that a signal strength of the wireless device is less than a preset value.

6. The method according to claim 2, wherein the network configuration step is the wireless device being connected to the server, monitoring an execution result of a network configuration step comprises:
    judging whether the wireless device is successfully connected to the server;
    determining that the execution result is success if the wireless device is successfully connected to the server;
    determining whether a number of times of reconnections exceeds a preset number of times if the wireless device is not successfully connected to the server;
    controlling the wireless device to be reconnected to the server if the number of times of reconnections does not exceed the preset number of times; and
    determining that the execution result is failure if the number of times of reconnections exceeds the preset number of times.

7. The method according to claim 6, wherein determining a corresponding failure reason comprises:
    detecting whether the wireless access point can be connected to Internet; and
    determining that the failure reason lies in that the wireless access point cannot be connected to the Internet if the wireless access point cannot be connected to the Internet.

8. The method according to claim 7, wherein detecting whether the wireless access point can be connected to Internet comprises:
    detecting whether a preset operation of the wireless device exists in the server, the preset operation comprising one of a login operation and an association request operation;
    determining that the wireless access point can be connected to the Internet if the preset operation exists in the server; and
    determining that the wireless access point cannot be connected to the Internet if the preset operation does not exist in the server.

9. The method according to claim 8, further comprising waiting for a third preset time before detecting whether the preset operation of the wireless device exists in the server.

10. The method according to claim 7, further comprising controlling the wireless device to be reconnected to the server if the wireless access point can be connected to the Internet.

11. A non-transitory storage medium, comprising a stored program, when the program is executed, the method for wireless network configuration according to claim 1 is implemented.

12. A processor, wherein the processor is configured to run a program, the method for wireless network configuration according to claim 1 is executed when the program is running.

13. The method according to claim 1, wherein the network configuration step is a step of a network configuration process, and the network configuration process comprises:

obtaining, by the mobile terminal, an identification of the wireless access point and a connection password;

transmitting, by the mobile terminal, the identification and the connection password to the wireless device;

connecting, by the wireless device, the wireless device to the wireless access point having the identification using the connection password;

connecting, by the wireless device, the wireless device to the server through the wireless access point; and feeding back, by the wireless device, a connection status to the mobile terminal.

14. The processor according to claim 12, wherein the mobile terminal is further configured to receive a connection status returned by the wireless device.

15. The processor according to claim 14, wherein the connection information comprises an identification of the wireless access point and a connection password.

\* \* \* \* \*